UNITED STATES PATENT OFFICE.

JOHN L. OHMAN, OF NIAGARA FALLS, NEW YORK, ASSIGNOR OF ONE-FOURTH NETTIE K. FARISH, OF NIAGARA FALLS, NEW YORK.

REFRACTORY MATERIAL.

1,356,939.     Specification of Letters Patent.     Patented Oct. 26, 1920.

No Drawing.     Application filed November 1, 1917. Serial No. 199,792.

*To all whom it may concern:*

Be it known that I, JOHN L. OHMAN, a subject of the King of Sweden, residing at Niagara Falls, New York, have invented certain new and useful Improvements in Refractory Materials, of which the following is a full, clear, and exact description.

The general object of my invention has been to provide a refractory material which shall be elastic and very durable, thus preventing cracking, disintegrating, corroding, and oxidizing.

Another object has been to provide a material which shall resist chemical action and one which shall greatly increase the life of the articles which are made therefrom.

Another object has been to provide a refractory material which is easily and cheaply manufactured, and one in which it is unnecessary to raise to the temperature of recrystallization in order to permanently bind the constituent materials together.

In this specification, I will describe my material as applied to the construction of a crucible; it being obvious that it can be used for making any heat resisting articles; such as, fire bricks, retorts, muffles, refractories, furnace cores, tubes, combustion boats, pyrometer tubes, furnace linings, and heat resisting cements.

It is well known to those skilled in the art, that crucibles in common use, and known to the trade as graphite crucibles, have been formed either of plumbago or graphite and preferably German clay, and a slight addition of silica in the shape of sand, sometimes fire sand. These graphite crucibles oxidize and disintegrate quite rapidly both from the action of the furnace fires on the outside of the crucible and from the effects of the fluxes on the inside thereof. The repeated heating and cooling to which they are subjected in ordinary use, causes them to flake off in large sheets (termed scalping) and also to crumble. The life of a graphite crucible, therefore, is comparatively short.

Furthermore, it is known, attempts have been made to make crucibles of silicon carbid with an adhesive material to hold the grains together, such as glue or pitch. In preparing the crucible or other refractory material, the mass of material has been pressed or molded into shape and subjected to the heat of an electric furnace, in which the temperature is raised to about the same temperature as originally used to produce the silicon carbid. At this temperature, the silicon carbid is recrystallized with the result that the finished product is very dense, hard, crisp, and non-flexible. The result is that, when a crucible made in this manner is subjected to the ordinary melting furnace conditions, it almost invariably cracks. One reason for this is that the heat of the fire causes the outside of the crucible to expand while the inside is kept cold by the mass of metal within the crucible. Another reason is that the crucible does not adapt itself to the expansion of the metal contained therein. When crucibles of this type crack or break, the cost of reconverting is prohibitive for commercial purposes, as the amount of electrical energy consumed in bringing it up to the reconverting temperature is enormous.

My material is made up, preferably, of the following elements in the proportions named:

Crystalline graphite, any suitable mesh, substantially 25 parts.

Silicon carbid substantially 68 parts,

Clay (low fusing point) substantially 7 parts.

Instead of the clay as the binder, I may use a metallic or non-metallic salt, oxid, or any other suitable fusion mixture. Furthermore, I may use any carbonizing binder (such as tar, pitch, or molasses) in conjunction with the crystalline graphite and the silicon carbid. When such carbonizing binders are used, a salt or clay of low fusing point may be used, if desired.

In making the crucible, the ingredients of my refractory material are thoroughly mixed, after which the mass is placed upon a potter's wheel and spun in the usual manner, or, if desired, pressed or molded into shape. After the crucible is formed by spinning, pressing or molding, it is dried and then baked at a low temperature (approximately 1000° C.), after which it is ready for use.

In my experiments, I found that a portion of the natural crystalline graphite is absolutely necessary in the construction of the larger refractory articles, if they are to be durable. Crystalline graphite is known for its very high fusion point; its good conductivity of heat; and its chemical resisting characteristics. The crystalline graphite of the crucible lies in thin laminæ or layers overlapping one another, thus giving a certain amount of flexibility to the whole body of the crucible, which enables the refractory articles to withstand sudden changes in temperature without cracking. As is well known, silicon carbid (SiC) is a product of the electric furnace, and it is a chemical compound of silicon and carbon. It has a very high fusion point; is very inert chemically as is graphite; is a good conductor of heat; has an extremely low co-efficient of expansion; and shows practically no oxidation under extreme heat.

Silicon carbid, therefore, mixed with crystalline graphite, makes a very suitable refractory article, which is a good conductor of heat, is elastic, tough, strong, and highly resistant to oxidation and the action of fluxes. The use of a metallic or nonmetallic salt, oxid, or other fusion mixture, is to assist in the binding of the materials and to form a protecting coating around the graphite and the carbonizing binder, when such binder is used.

While I have set forth certain proportions of the different ingredients, it is obvious that they may be varied somewhat, without departing from my invention, as, for instance, when making a very small crucible, a large proportion of silicon carbid may be used; but, when making the larger crucibles, the proportion of graphite will be increased to give the finished product sufficient flexibility, so that it will expand and contract without fracture.

While I have used the term "crystalline" in this application as applied to graphite, it is to be understood that this term also includes flake graphite which is the equivalent of crystalline graphite.

Having thus described my invention, what I claim is:

1. A non-recrystallized refractory material for heat resisting articles, comprising silicon carbid and crystalline graphite.

2. A non-recrystallized refractory material for heat resisting articles, comprising silicon carbid, crystalline graphite, and a carbonizing binder.

3. A non-recrystallized refractory material for heat resisting articles, comprising crystalline graphite, silicon carbid, and a salt.

4. A non-recrystallized refractory material for heat resisting articles, comprising crystalline graphite, silicon carbid, and a binder.

5. A non-recrystallized refractory material for heat resisting articles, comprising crystalline graphite, silicon carbid, a binder, and a salt.

6. A non-recrystallized refractory material for heat resisting articles, comprising substantially 25% of crystalline graphite, substantially 68% of silicon carbid, and substantially 7% of a binder.

7. A non-recrystallized refractory material for heat resisting articles, comprising crystalline graphite, silicon carbid, a carbonizing binder, and a salt.

8. A non-recrystallized refractory material for heat resisting articles, comprising substantially 68% of silicon carbid, substantially 25% of crystalline graphite, and substantially 7% of a carbonizing binder, and a salt.

9. A non-recrystallized refractory material for heat resisting articles, comprising substantially 68% of silicon carbid, substantially 25% of crystalline graphite, and substantially 7% of a salt.

10. A non-recrystallized refractory material for heat resisting articles, comprising crystalline graphite, silicon carbid, and a fusion agent.

11. A non-recrystallized refractory material for heat resisting articles, comprising crystalline graphite, silicon carbid, a carbonizing binder, and a fusion agent.

In testimony whereof, I have hereunto signed my name.

JOHN L. OHMAN.